US011919748B2

(12) United States Patent
Ma et al.

(10) Patent No.: US 11,919,748 B2
(45) Date of Patent: Mar. 5, 2024

(54) HOIST FOR TRANSFERRED MATERIALS IN UNDERGROUND AUXILIARY TRANSPORTATION SYSTEM AND METHOD THEREOF

(71) Applicants: CHINA UNIVERSITY OF MINING AND TECHNOLOGY, Jiangsu (CN); Changzhou Development & Manufacture Centre Co., Ltd., Jiangsu (CN); XUZHOU COAL MINE SAFETY EQUIPMENT MANUFACTURE CO., LTD., Jiangsu (CN)

(72) Inventors: Chi Ma, Jiangsu (CN); Yuxing Peng, Jiangsu (CN); Zhencai Zhu, Jiangsu (CN); Meilin Wang, Jiangsu (CN); Changhua Hu, Jiangsu (CN); Fahui Shi, Jiangsu (CN); Xingming Xiao, Jiangsu (CN); Jun Qian, Jiangsu (CN); Fan Jiang, Jiangsu (CN); Yunwang Li, Jiangsu (CN); Dagang Wang, Jiangsu (CN); Qihang Yu, Jiangsu (CN)

(73) Assignees: CHINA UNIVERSITY OF MINING AND TECHNOLOGY, Jiangsu (CN); Changzhou Development & Manufacture Centre Co., Ltd., Jiangsu (CN); XUZHOU COAL MINE SAFETY EQUIPMENT MANUFACTURE CO., LTD., Jiangsu (CN)

( * ) Notice: Subject to any disclaimer, the term of this patent is extended or adjusted under 35 U.S.C. 154(b) by 0 days.

(21) Appl. No.: 18/022,846

(22) PCT Filed: May 23, 2022

(86) PCT No.: PCT/CN2022/094418

§ 371 (c)(1),
(2) Date: Feb. 23, 2023

(87) PCT Pub. No.: WO2023/092967

PCT Pub. Date: Jun. 1, 2023

(65) Prior Publication Data

US 2023/0382691 A1 Nov. 30, 2023

(30) Foreign Application Priority Data

Nov. 23, 2021 (CN) ......................... 202111393034.8

(51) Int. Cl.
*B66C 1/66* (2006.01)
*B66C 11/04* (2006.01)
*B66C 13/16* (2006.01)

(52) U.S. Cl.
CPC ................ *B66C 1/66* (2013.01); *B66C 11/04* (2013.01); *B66C 13/16* (2013.01)

(58) Field of Classification Search
CPC ........... B66C 1/66; B66C 1/663; B66C 1/101; B66C 11/04; B66C 13/16
(Continued)

(56) References Cited

U.S. PATENT DOCUMENTS 3,677,599 A * 7/1972 Shannon ................ B66C 1/663 294/81.53
3,899,205 A * 8/1975 Lanigan .................. B66C 1/663 294/67.31
(Continued)

FOREIGN PATENT DOCUMENTS

CN 1659096 A 8/2005
CN 101200266 A 6/2008
(Continued)

OTHER PUBLICATIONS

Written Opinion of the International Searching Authority, International Patent Application No. PCT/CN2022/094418, dated Aug. 11, 2022, 6 pages.

*Primary Examiner* — Paul T Chin
(74) *Attorney, Agent, or Firm* — Casimir Jones, S.C.; Brian F. Bradley

(57) ABSTRACT

A hoist for transferred materials in an underground auxiliary transportation system and a method thereof. The hoist includes a hoist body, guiding plates mounted at two ends of the hoist body through bolts, twist locks mounted at four ends of the hoist body, a driving unit configured to drive twist locks to rotate, transmission assemblies configured to connect the twist locks with the driving unit, ejector pins
(Continued)

configured to prevent the twist locks from rotating mistakenly, and a sensor configured to control the hoist to operate and provide protection safety.

8 Claims, 6 Drawing Sheets

(58) Field of Classification Search
USPC .................................. 294/81.41, 81.53, 81.1
See application file for complete search history.

(56) References Cited

U.S. PATENT DOCUMENTS

| | | | | | |
|---|---|---|---|---|---|
| 4,488,749 | A * | 12/1984 | Voelz | B66C 1/663 | 294/81.21 |
| 4,521,044 | A * | 6/1985 | Appleman | B66C 1/663 | 294/81.1 |
| 5,052,734 | A | 10/1991 | Hasegawa et al. | | |
| 5,280,980 | A * | 1/1994 | Coatta | B66C 1/102 | 294/81.1 |
| 5,354,112 | A * | 10/1994 | Hara | B66C 1/101 | 294/81.5 |
| 6,161,887 | A * | 12/2000 | Shiota | B66C 1/663 | 294/81.5 |
| 7,128,353 | B2 * | 10/2006 | Jussila | B66C 1/663 | 294/81.53 |
| 7,152,895 | B1 * | 12/2006 | Jussila | B66C 1/663 | 294/81.53 |
| 7,665,784 | B2 * | 2/2010 | Stinis | B66C 1/663 | 294/81.53 |
| 8,840,159 | B2 * | 9/2014 | Karlsson | B66C 1/102 | 294/81.53 |
| 10,968,081 | B2 * | 4/2021 | Karlsson | B66C 1/101 | |
| 11,492,234 | B2 * | 11/2022 | Karlsson | B66C 1/101 | |

FOREIGN PATENT DOCUMENTS

| | | | |
|---|---|---|---|
| CN | 2022458680 | U | 5/2012 |
| CN | 106365024 | | 2/2017 |
| CN | 106966292 | | 7/2017 |
| CN | 110745684 | A | 2/2020 |
| CN | 210438290 | U | 5/2020 |
| CN | 211545639 | | 9/2020 |
| CN | 113247755 | A | 8/2021 |
| CN | 114030986 | | 2/2022 |
| JP | 2021046281 | A | 3/2021 |

* cited by examiner

HOIST FOR TRANSFERRED MATERIALS IN UNDERGROUND AUXILIARY TRANSPORTATION SYSTEM AND METHOD THEREOF

TECHNICAL FIELD

The present disclosure relates to a hoist for transferred materials in an underground auxiliary transportation system and a method thereof, belongs to the technical field of underground transferring transportation.

BACKGROUND

The coal industry is a pillar industry in China. With the development and progress of high-tech and modern production, the output of coal mine enterprises is also increasing year by year. Under this situation, the coal mine auxiliary transportation is particularly important for the development of coal mines. The traditional coal auxiliary transportation system is backward in equipment and has poor safety, large numbers of operators, large labor volume, low efficiency. Compared with other aspects of coal production, the development of the current coal mine auxiliary transportation system is relatively lagging behind.

At present, the traditional auxiliary transportation system in China has scattered operating surfaces and complicated transportation routes, which leads to many transferring links in the transportation process. In addition to some simple machines, such as manual hoists, prop-pulling winches, jacks and hand tool crowbars, the main loading and unloading ways in China are basically on people pushing and shoulders holding, which requires a lot of time and manpower and greatly affects the efficiency. In order to improve the mechanization of the entire auxiliary transportation system, many scholars optimize the designs on the premise of reducing the transferring links. However, since the situations of mines in China are different, it is difficult to completely avoid the transferring links, so it is necessary to realize the mechanization of the transferring links.

In order to solve the above problems, it is necessary to design a hoist suitable for the underground environment to realize the transferring of materials from ground to ground and ground to air.

SUMMARY

In view of the development requirements for the coal mine auxiliary transportation system, the objectives of the present disclosure are to provide a hoist, which can satisfy the ground-to-air and ground-to-ground transferring requirements for underground materials, and can adapt to the underground environment and has a simple operation and a high safety performance.

In order to solve the above-mentioned technical problems, the following technical solutions are adopted in the present disclosure.

Provided is a hoist for transferred materials in an underground auxiliary transportation system. The hoist includes as follows.

A hoist body is provided, four corners at two ends of the hoist body are respectively provided with twist locks inserted into lock holes at four top corners of a transferring trolley.

A driving unit is arranged inside the hoist body, and drivingly connected with the four twist locks through a linkage mechanism, the hoist further includes as follows.

A twist lock closing sensor is configured to send a twist lock closing signal when the twist locks are closed.

A twist lock opening sensor is configured to send a twist lock opening signal when the twist locks are opened.

A pressure sensor is configured to detect an axial pressure received by each twist lock in real time and send pressure signals.

Ejector pins are arranged at end portions of the hoist body and located on one sides of the twist locks, after the four twist locks on the hoist and the lock holes at the four top corners of the transferring trolley are in position with each other, the ejector pins are capable of moving.

Ejector pin position-limitation sensors are configured to detect movements of the ejector pins and send displacement signals.

A laser ranging sensor is arranged on the hoist body and configured to measure a distance between the hoist body and the transferring trolley.

A photosensitive sensor is arranged on the transferring trolley and configured to receive a laser signal from the laser ranging sensor.

The hoist body includes as follows.

A cross beam is provided.

Two end beams are symmetrically arranged at both ends of the cross beam along a longitudinal direction, both ends of each of the end beams are provided with shaft holes, respectively, and one of the twist locks is mounted inside each of the shaft holes.

The driving unit is assembled on a beam wall at a middle position inside the cross beam, and two telescopic driving shafts are symmetrically arranged on the driving unit with the driving unit as a center.

The linkage mechanism includes two groups respectively connected with the two telescopic driving shafts of the driving unit, and each group of the linkage mechanisms includes a pushing rod, a connecting rod, first sliding blocks and rotating levers, one end of the pushing rod is connected with a respective one of the telescopic driving shafts through a coupling, and another end of the pushing rod is connected with the connecting rod arranged inside the end beam, sliding channels arranged along an axial direction of the connecting rod are respectively arranged at both ends of the connecting rod, the first sliding blocks are mounted inside the sliding channels, and the rotating levers are key connected with the first sliding blocks.

An upper portion of each of the twist locks is connected with a twist lock shaft, and an upper end of the twist lock shaft is sequentially connected with shaft holes of the pressure sensor, a positioning sleeve and a respective one of the rotating levers to connect with a locking nut after the upper end of the twist lock shaft passes through a respective one of the shaft holes on the end beam and enters an interior of the end beam.

Each of the end beams is a foldable structure, which includes as follows.

The end beam includes one fixed end beam unit, and two foldable end beam units connected at both ends of the fixed end beam unit. The two foldable end beam units are respectively a first foldable end beam unit and a second foldable end beam unit, the two foldable end beam units are rotatable relative to the fixed end beam unit, and the end beam further includes as follows.

The end beam further includes a first folding arm, a second folding arm, connecting seats, hinging seats and a first hydraulic cylinder.

The first folding arm and the second folding arm are hinged with each other at adjacent ends, and another end of the first folding arm is fixedly connected to a connecting seat, the connecting seat is mounted on the first foldable end beam unit, and is slidable on the first foldable end beam unit.

Another end of the second folding arm is fixedly connected to a hinging seat, and the hinging seat is mounted on the second foldable end beam unit and is slidable on the second foldable end beam unit.

The first hydraulic cylinder is connected between the first folding arm and the second folding arm, a cylinder barrel of the first hydraulic cylinder is hinged with the first folding arm through a hinged joint, and an outer end of a piston rod of the first hydraulic cylinder is hinged with the second folding arm.

The cross beam is a retractable structure, which includes as follows.

The cross beam includes one fixed cross beam unit and two movable cross beam units connected at both ends of the fixed cross beam unit. The two movable cross beam units are respectively a first movable cross beam unit and a second movable cross beam unit, and the two movable cross beam units are slidable relative to the fixed cross beam unit.

The pushing rod includes a plurality of pushing rod units, each two adjacent pushing rod units are hinged with each other, one of the pushing rod units is connected with a driving shaft of a hydraulic motor.

A sliding track is arranged on a beam wall of each of the movable cross beam units, and the hydraulic motor is slidably connected with the sliding track.

The hoist further includes a rope-pulling mechanism, the rope-pulling mechanism includes as follows.

The rope-pulling mechanism includes a first fixed pulley, a second fixed pulley, a movable pulley, a wire rope and a second hydraulic cylinder. One end of the wire rope is fixed on the first movable cross beam unit, and another end of the wire rope is fixedly connected with the second movable cross beam unit after passing by an upper end of the first fixed pulley, a lower end of the movable pulley and an upper end of the second fixed pulley sequentially.

One end of the second hydraulic cylinder is fixed on an inner wall of the fixed cross beam unit, and an end of a piston rod of the second hydraulic cylinder is connected with the movable pulley.

The hoist further includes anti-detaching mechanisms arranged on the end beams proximate to the twist locks, each of the anti-detaching mechanisms includes as follows.

A cam is mounted on the connecting rod.

A baffle is fixed inside the end beam. The baffle is provided with a vertical sliding channel slidably connected with a transmission component through a second sliding block, an upper end of the transmission component is in contact with the cam through a first roller, two bifurcation portions are formed by a lower end of the transmission component, and an end portion of each of the two bifurcation portions is connected with one second roller.

Two claws are provided. One end of each of the two claws is rotatably connected with the baffle, and a spring is connected between the two claws.

The driving unit is a double-rod hydraulic cylinder.

The present disclosure further discloses a method for hosting transferred materials in an underground auxiliary transportation system, which uses the hoist for the transferred materials in the underground auxiliary transportation system. The method includes the following steps.

Provided is a method for positioning the hoist: a hoist body is moved above the transferring trolley by an operator, when a signal from a laser ranging sensor is detected by a photosensitive sensor, a prompt signal is sent by the photosensitive sensor, where the hoist body is located directly above a standard container and the operator enables the hoist to start for operation.

When a roadway is narrow, a size of the hoist is reduced to adapt to a narrow and complex terrain of the roadway through contracting a width of a cross beam and folding end beams, and when the hoist reaches the underground, the hoist is unfolded.

Provided is a process of lifting heavy weights by the hoist: before the hoist is descended, an operating state of the hoist is determined by the pressure sensor, the operating state is recorded as operating state A, signals from ejector pin position-limitation sensors and the twist lock closing sensor are detected by a hydraulic lifting system, only when the ejector pin position-limitation sensors have signals and the twist lock closing sensor 18 has no signal, the hydraulic lifting system is locked, and the locking of the hydraulic lifting system is released during the rest time.

According to a signal fed back by the laser ranging sensor, a descending speed of the hoist body is adjusted by the hoist body during the descending process.

When the hoist is in contact with the standard container, the ejector pins are ejected, signals are sent by the ejector pin position-limitation sensors to stop the hydraulic lifting system from descending and lock an elevation, meanwhile, the driving unit drives four twist locks at end portions of the hoist body to rotate 90 degrees at the same time, and the driving unit enables the connecting rods to be in contact with the twist lock closing state sensor.

At this time, when a contact signal is not sent by the twist lock closing sensor beyond a time limit, no actions are performed and an alarm is sent by the hydraulic lifting system.

When the contact signal is sent by the twist lock closing state sensor, the hoist body is started lifting by the hydraulic lifting system, the hydraulic lifting system is in a loading state, forces received by four twist locks are monitored by the pressure sensor when the standard container is hoisted in real time, and when data for one or more pressure sensors are abnormal and the displayed pressure is 0 or exceeds an upper limit, an alarm is sent by the hoist.

Provided is a process of releasing heavy weights by the hoist: before the hoist body is descended, an operating state of the hoist body is determined by the pressure sensor, the operating state is recorded as an operating state B, according the signal fed back by the laser ranging sensor and a change of a distance, a speed of the hydraulic lifting system is changed by the hoist during the descending process, when the hoist body is in contact with the standard container, the ejector pins are ejected, signals are sent by the ejector pin position-limitation sensors, the hoist is driven by the hydraulic lifting system to stop from descending and lock an elevation, meanwhile, the driving unit drives the twist locks to rotate 90 degrees in opposite directions, enables the connecting rods to be in contact with the twist lock opening state sensor, at this time, when the contact signal is not sent by the twist lock opening state sensor beyond the time limit, no actions are performed and the alarm is sent by the hydraulic lifting system.

When the contact signal is sent by the twist lock opening state sensor, it is indicated that the releasing is successful.

The hydraulic lifting system is a hydraulic hoist.

The beneficial effects of the present disclosure lie in the following.

1. The present disclosure can simultaneously drive four twist locks to rotate through the lateral movement of the piston rod, which realizes the fast interlocking, ensures the synchronous actions of the twist locks, and can effectively avoid the misoperations of one or more twist locks.

2. Positioning sensors and safety protection sensors are provided in the present disclosure, which has a simple positioning, can realize the automatic lifting and releasing of heavy weights by the hoist, and avoid disorders between the actions.

3. The anti-detaching mechanism is mounted on the hoist in the present disclosure, which can prevent the materials from falling off when an accident occurs.

4. The folding mechanism can ensure the rigidity and stability of the overall structure in cooperation with the rope-pulling mechanism while changing the size of the hoist, which adapts to the transportation in narrow and complex areas in the underground and ensures the safety of the equipment and operators.

5. The adopted hydraulic cylinders and hydraulic hoists can satisfied the requirements for the underground explosion-proof.

1. Hydraulic Hoist; 2. Standard Container.

3. Cross Beam; 31. Nut; 32, rotating lever; 33. Positioning Sleeve; 34. Bearing; 35. Twist Lock Shaft; 36. Pressure Sensor; 302. Second cross beam.

4. Ejector Pin; 41. Baffle; 42. Pin Shaft; 43. Second Sliding Block.

5. Twist Lock; 51. First Fixed Pulley; 52. Second Fixed Pulley; 53. Movable Pulley; 54. Wire Rope; 55. Second Hydraulic Cylinder.

6. Guiding Plate; 61. End Beam; 611. Fixed End Beam Unit; 612. Foldable End Beam Unit; 62. Connecting Seat; 63. Hinging Seat; 64. First Folding Arm; 65. Second Folding Arm; 66. First Hydraulic Cylinder.

7. Laser Ranging Sensor; 71. Cam; 72. Transmission Component; 73. Claw; 74. First Roller; 75. Second Roller; 76. Spring.

8. Photosensitive Sensor; 9. Transferring Trolley.

11. Connecting Rod; 111. First Connecting Rod; 112. Second Connecting Rod.

First Sliding Block.

13. Pushing Rod; 131. First Pushing Rod; 132. Second Pushing Rod; 133. Third Pushing Rod; 134, Fourth Pushing Rod; 135. Fifth Pushing Rod.

14. Coupling; 15. Two-way Piston Rod; 16. Cylinder; 17. Cylinder Seat; 18. Twist Lock Closing State Sensor; 19. Twist Lock Opening Sensor; 20. anti-detaching Mechanism; 21. Ejector Pin Position-limitation Sensor; 22. Hydraulic Motor; 23. Sliding Track.

DETAILED DESCRIPTION OF THE EMBODIMENTS

The present disclosure will be further described with reference to the accompanying drawings and the specific implementations in the followings.

Figure 1:
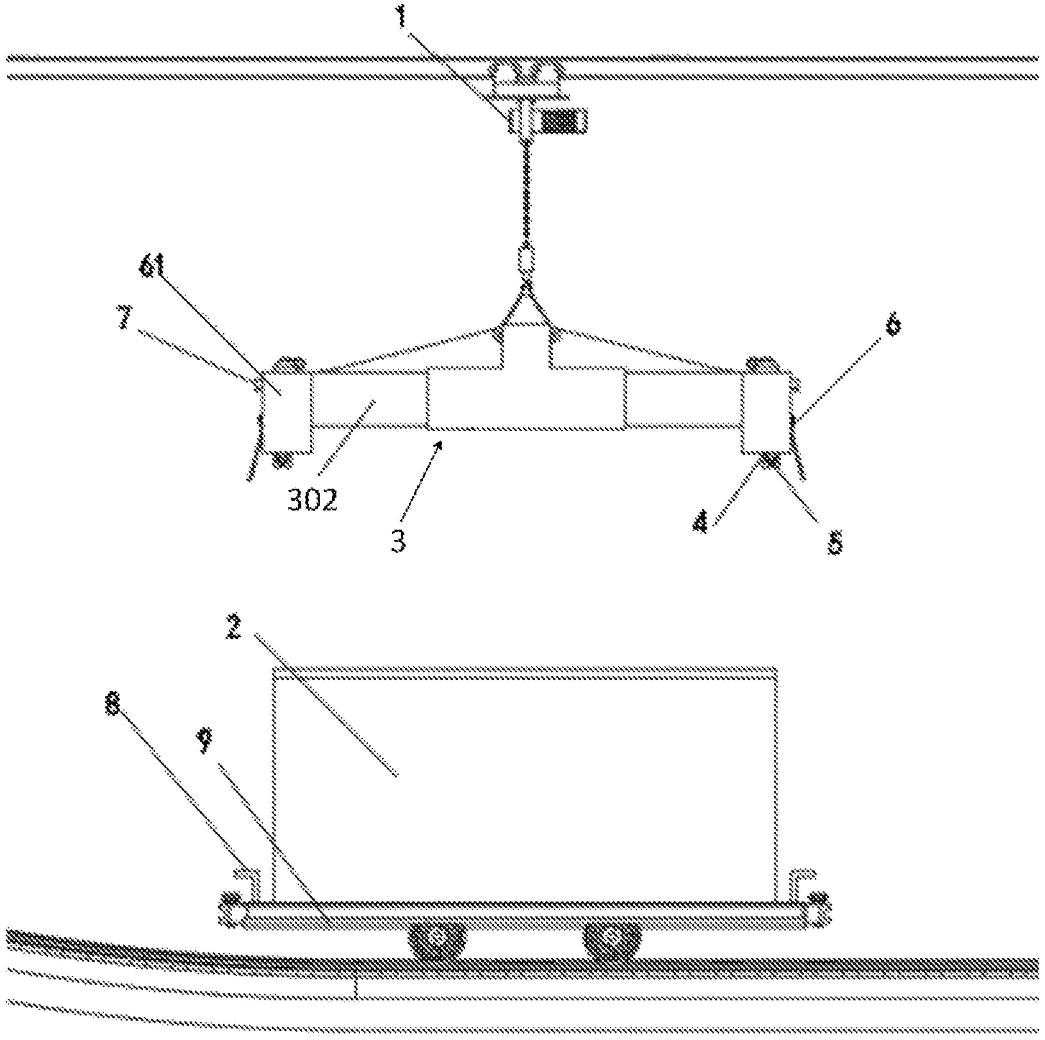
FIG. 1 illustrates a front view of a hoist for transferred materials in an underground auxiliary transportation system provided by the present disclosure.
Figure 2:
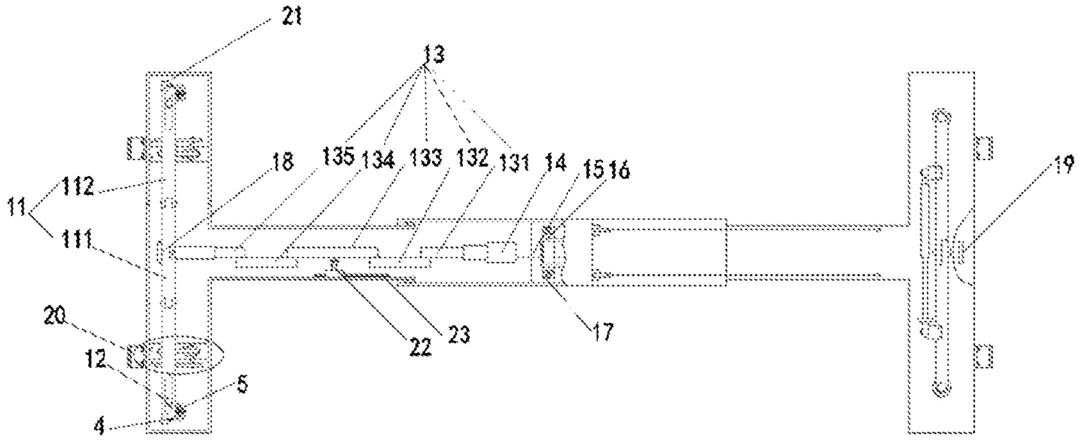
FIG. 2 illustrates a schematic structural diagram inside the hoist of the present disclosure.

As illustrated in FIG. 1 and FIG. 2, the present disclosure provides a hoist for transferred materials in an underground auxiliary transportation system, which includes a hydraulic hoist 1, a standard container 2, a cross beam 3, end beams 61, ejector pins 4, twist locks 5, guiding plates 6, a laser ranging sensor 7, a photosensitive sensor 8, a transferring trolley 9, driving assemblies and transmission assemblies. The left and right end beams 61 are welded at both ends of the cross beam 3 to form a main frame of the hoist. One guiding plate 6 is mounted on one side of each of the end beams 61 and is detachable freely. A twist lock closing state sensor 18, a twist lock opening state sensor 19 and an anti-detaching mechanism 20 are arranged inside the left and right end beams, respectively. In addition, four corners of the end beams 2 are provided with shaft holes, and four twist locks 5 and the ejector pins 4 are respectively installed at four shaft holes of the left and right end beams 2, the twist locks 5 are in cooperation with the end beams 2 through bearings 34, that is, the twist locks are rotatable relative to the end beams 2. The driving assemblies, cross beam folding mechanisms and the transmission assemblies are mounted inside the frame, the transmission assemblies are capable of converting the movements into rotations and transmitting the rotations to the twist locks 5, so as to realize the rotations of the twist locks 5, and the cross beam folding mechanisms are capable of realizing the contraction and extension of the cross beam.

Each of the above-mentioned driving assemblies mainly includes a hydraulic cylinder 16, a two-way piston rod 15, and a cylinder seat 17. Each of the transmission assemblies mainly includes a pushing rod 13, a connecting rod 11, first sliding blocks 12 and rotating levers 32. The cylinder 16 is arranged on the cylinder seat 17. A box wall of the cross beam 3 is provided with a plurality of circular holes, the cylinder seat 17 is assembled on the box wall of the cross beam 3 through cooperations between bolts and the circular holes. The piston rod 15 is connected with the pushing rod 13 through a coupling 14, and the pushing rod 13 is connected with the connecting rod 11 through a bolt. The connecting rod 11 is provided with two sliding channels, and the first sliding blocks 12 are placed into the sliding channels and are connected with the rotating levers 32.

Figure 4:
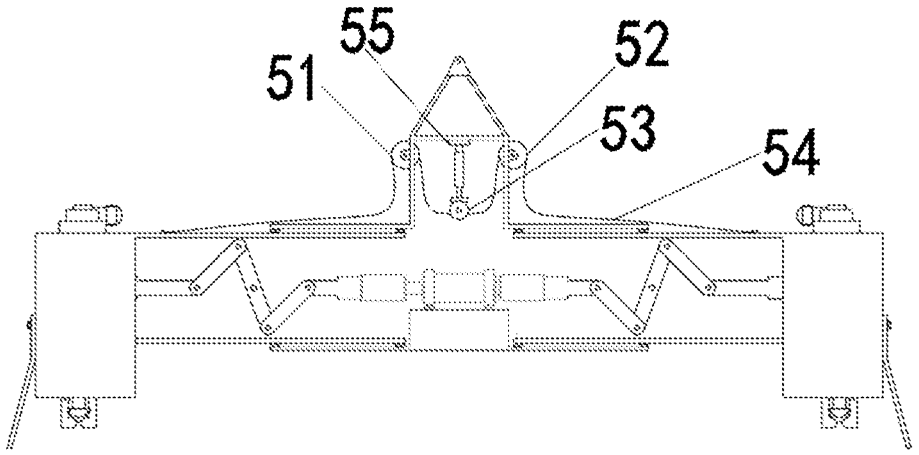
FIG. 4 illustrates a schematic structural diagram of a contraction of a cross beam and a rope-pulling mechanism of the present disclosure.
Figure 5:
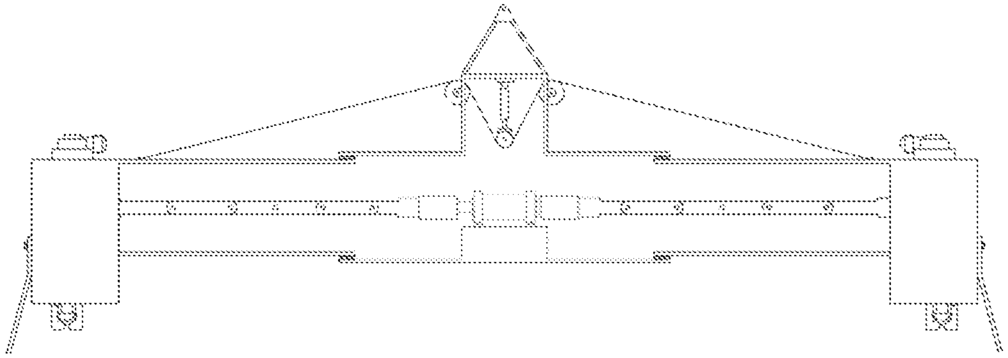
FIG. 5 illustrates a schematic structural diagram of an elongation of the cross beam of the present disclosure.

Each of the above-mentioned cross beam folding mechanisms mainly includes the pushing rod 13, a hydraulic motor 22 and a sliding track 23. The pushing rod is divided into a first pushing rod 131, a seconding pushing rod 132, a third pushing rod 133, a fourth pushing rod 134, and a fifth pushing rod 135. Each two adjacent pushing rods are rotatably connected with each other. The hydraulic motor 22 is mounted at a middle position of the third pushing rod 133, and forms a moving pair with the sliding track 23. The sliding track 23 is fixed on an inner wall of a second cross beam 302, and the sliding track 23 and the piston rod 15 are in the same line. A folding state of the folding arm mechanism is as illustrated in FIG. 4, the third pushing rod 133 is driven by the hydraulic motor 22 for rotation to eventually realize the straightening of the folding arm, as illustrated in FIG. 5. When the hoist is ready to lift the heavy weights, the hydraulic motor 22 is self-locking, and the orientation of the pushing rod 3 is retained.

Figure 6:
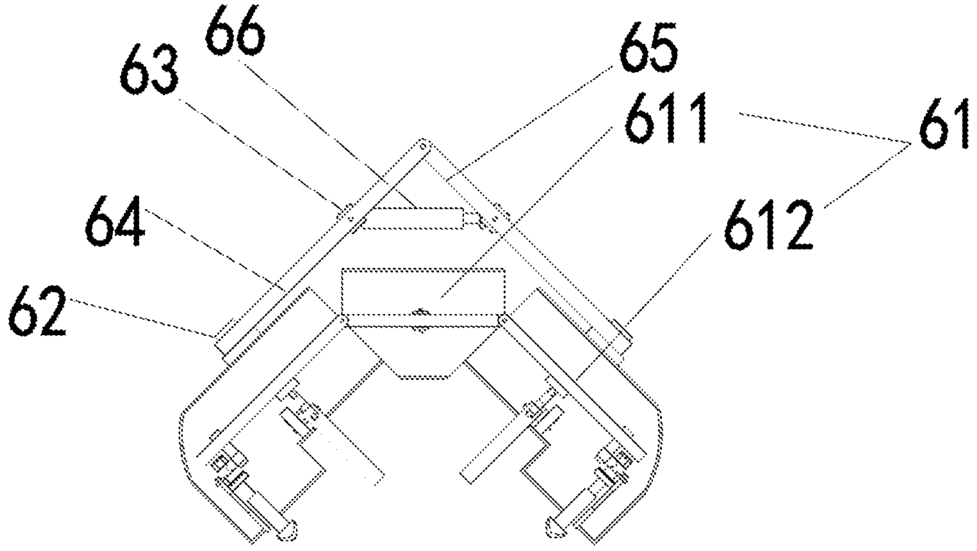
FIG. 6 illustrates a schematic structural diagram of contractions of end beams of the present disclosure.
Figure 7:
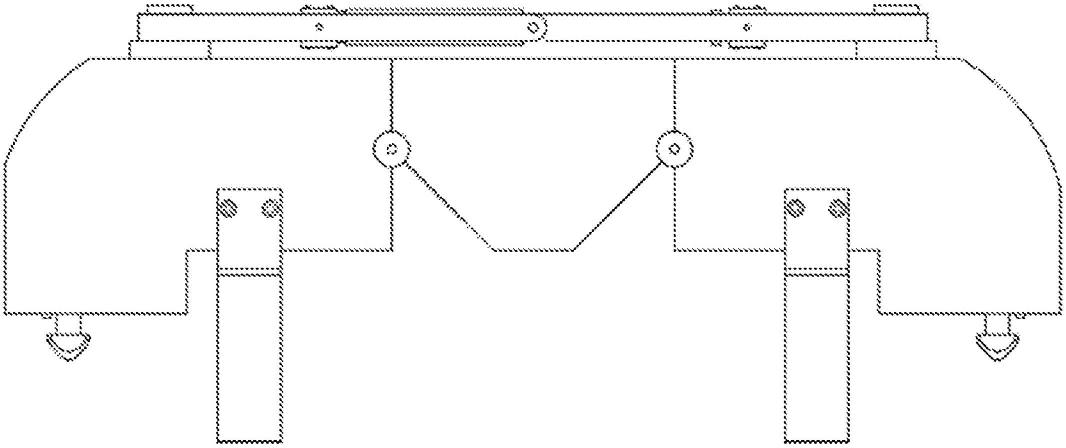
FIG. 7 illustrates a schematic structural diagram of elongations of the end beams of the present disclosure.
Figure 8:
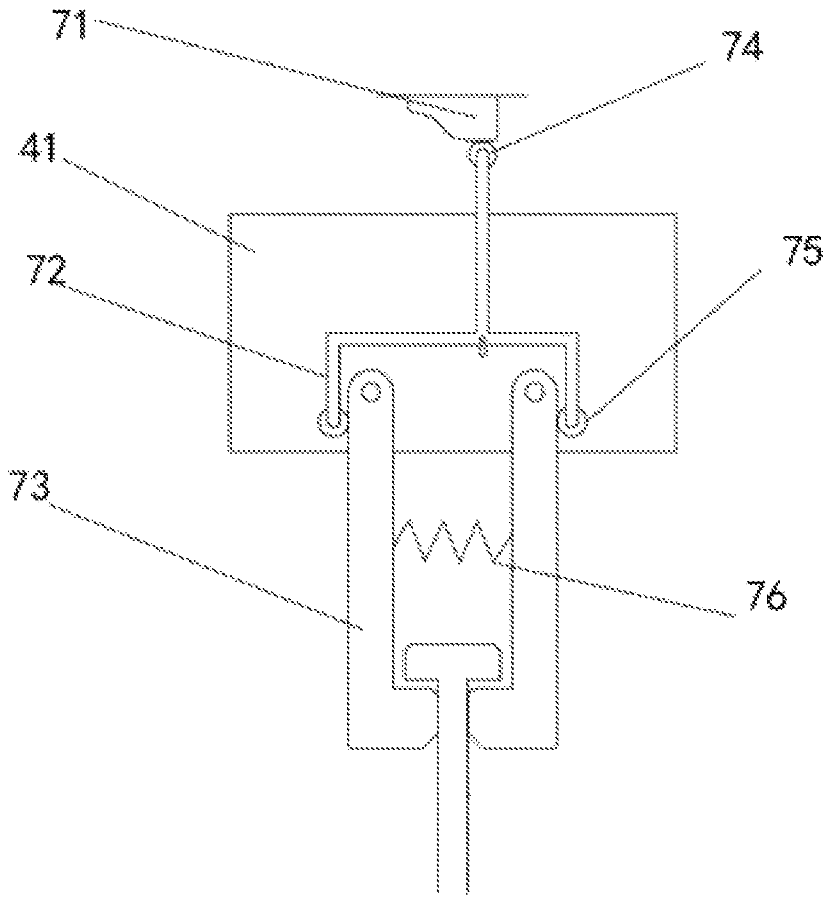
FIG. 8 illustrates a schematic structural diagram of an anti-detaching mechanism of the present disclosure.

As illustrated in FIG. 6, each of the end beam folding mechanisms includes a first folding arm 64, a second folding arm 65, connecting seats 62, hinging seats 63 and a first hydraulic cylinder 66. The connecting seats 62 are fixed to one ends of the first folding arm 64 and the second folding arm 65. The connecting seats 62 are mounted on the top portions of the foldable end beam units 612 and are slidable relative to the foldable end beam units 612. The hinging seats 63 are fixed at arm bodies of the first folding arm 64 and the second folding arm 65. The first hydraulic cylinder 66 is rotatably connected with the hinging seats 62, and the first folding arm 64 and the second folding arm 65 are rotatably connected with each other and are respectively parallel to the foldable end beam units 612. As illustrated in FIG. 7, when the first hydraulic cylinder 66 is extended, the first folding arm 64 and the second folding arm 65 are rotated relative to each other, and eventually are in the same straight line. The foldable end beam units 612 are rotated relative to the fixed end beam unit 611. The second connecting rods 112 are rotated relative to the first connecting rods 111 inside the end beams, the entire folding arm mechanism provides a support for the end beams, improves force distributions of the end beams, and ensures stabilities of the end beams.

As illustrated in FIG. 4, the rope-pulling mechanism is composed of a first fixed pulley 51, a second fixed pulley 52, a movable pulley 53, a wire rope 54 and a second hydraulic cylinder 55. The wire rope 54 is wound around an upper end of the first fixed pulley 51, a lower end of the movable pulley 53, and an upper end of the second movable pulley 52. Both ends of the wire rope 54 are fixed on the second cross beam 302. One end of the second hydraulic cylinder 55 is fixed on an inner wall of the cross beam, and the other end of the second hydraulic cylinder 55 is connected with the movable pulley 53. The second hydraulic cylinder 55 is capable of enabling the movable pulley 53 to move up and down, and according to the different elongation lengths of the cross beam, the wire rope 54 is capable of being straightened by changing the position of the movable pulley 53, which provides a certain pulling force to the cross beam, improves the rigidity of the cross beam and ensures the stability of the structure.

Figure 3:
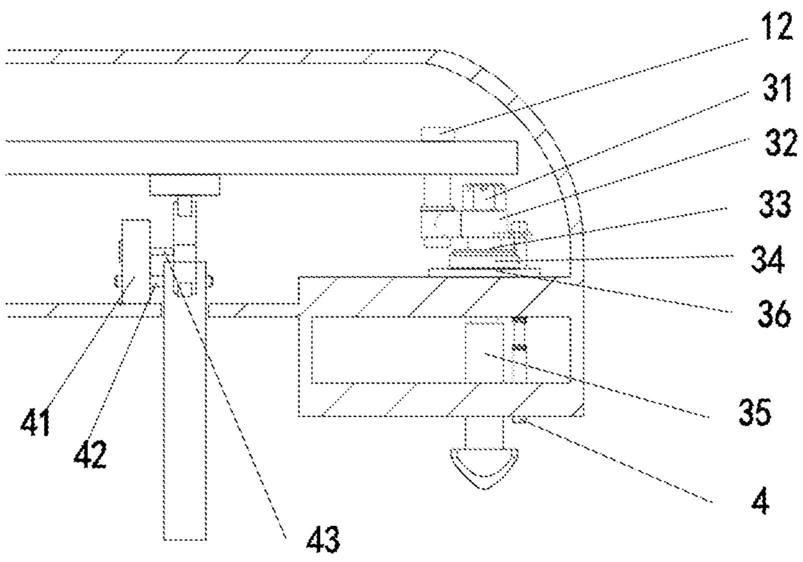
FIG. 3 illustrates a schematic structural diagram of twist locks of the present disclosure.

As illustrated in FIG. 3, each of the twist locks 5 includes a twist lock shaft 35, which passes through an upper mounting plate and is sleeved with a positioning sleeve 33. A pressure sensor 36, the bearing 34 and the rotating lever 32 are locked with each other by a nut 31. The rotating lever 32 is provided with a notch to clamp an ejector pin device 4. The ejector pin position-limitation sensors 21 are capable of feeding back the operating states of the ejector pins. The pressure sensor 36 is configured to control the operating state of the hydraulic hoist lifting system. When no pressure is generated, the hydraulic lifting system is in a no-load state (recorded as operating state A), and when the pressure is generated, the hydraulic lifting system is in a loaded state (recorded as operating state B). In addition, the forces received by four twist locks are monitored by the pressure sensor in real time when the standard container is hoisted, and when the data for one or more pressure sensors are abnormal, the displayed pressure is 0 or exceeds an upper limit of the loading, an alarm is sent by the hoist.

When in use, four locking heads 5 are inserted into the four corner-fitting holes of the standard container 2, respectively, and then the piston rod 15 in the driving assemblies is capable of being driven by the hydraulic pump to move, thereby driving the pushing rods 13 and the transmission components 11 to move, the movement of the transmission components 11 enables the first sliding blocks 12 to slide in the sliding channels, and the sliding of the first sliding blocks 12 will drive the rotating levers 32 to rotate, and eventually enables the twist locks 5 to rotate 90 degrees, and the four corner-fitting holes of the standard container 2 are locked on the four twist locks 5.

In order to ensure the safety of operators, the anti-detaching mechanisms 20 are provided to the hoist. As illustrated in FIGS. 3 and 6, a cam 71 is mounted on the connecting rod 11, the transmission component 72 is connected with the sliding channel on a baffle 41 through the second sliding block 43, and a first roller 74 mounted on the transmission component 72 is in contact with the cam 71, a second roller 75 is in contact with a claw 73, the claw 73 is rotatable through a pin shaft 42. When the transmission assembly drives the twist lock 5 to lock, the connecting rod 11 moves to one side, the cam 71 moves relative to the first roller 74, and drives the transmission component 72 to move downward, the second roller 75 moves on the claw 73, and the claw 73 are rotated to close. When the twist lock 5 is unlocked, the cam 71 returns to an original position, and the claw 73 is opened under the action of the spring 76.

Provided is a method for positioning the hoist: the hoist body is moved above the transferring trolley 9 by an operator, when a signal of the laser ranging sensor 7 is detected by the photosensitive sensor 8, a prompt signal is sent by the photosensitive sensor 8, where the hoist body is located directly above a standard container 2 and the operator enables the hoist is start for operation.

A process of lifting heavy weights by the hoist is as follows. First, before the hoist is descended, an operating state (operating state A) of the hoist is determined by the pressure sensor 36. During the descending process, a speed of the hydraulic hoist is adjusted by the hoist according to a signal fed back by the laser ranging sensor 7. When the hoist is in contact with the standard container 2, the ejector pins 4 are ejected, the signals are sent by the ejector pin position-limitation sensors 21, the hydraulic hoist is locked, the locking of the hydraulic cylinder of the hoist is released, and the hydraulic hoist stops descending and the twist lock rotates 90 degrees, the connecting rod 11 is in contact with the twist lock closing state sensor 18, the locking of the hydraulic hoist is released, and the hydraulic hoist will stop after being lifted to a fixed height.

A process of releasing heavy weights by the hoist is as follows: First, before the hoist is descended, an operating state (operating state B) is determined by the pressure sensor 36. During the descending process, a speed of the hydraulic hoist is adjusted by the hoist according to a signal fed back by the laser ranging sensor 7. When the hoist is in contact with the standard container, the ejector pins 4 are ejected, signals are sent by the ejector pin position-limitation sensors 21, the hydraulic hoist is locked, the locking of the hydraulic cylinder of the hoist is released, the hydraulic hoist stops descending and the twist lock rotates 90 degrees, the connecting rod 11 is in contact with the twist lock opening state sensor 19, the locking of the hydraulic hoist is released, and the hydraulic hoist will stop after being lifted to the fixed height.

In the operating state A, the hydraulic hoist system detects signals from the ejector pin position-limitation sensors 21 and the twist lock closing sensor 18, only when the ejector pin position-limitation sensors 21 have the signals and the twist lock closing sensor 18 has no signal, the hydraulic hoist is locked, and the locking is released during the rest time. In the operating state B, the hydraulic hoist system detects the ejector pin position-limitation sensors 21 and the twist lock opening state sensor 19, only when the ejector pin position-limitation sensors 21 have signals and the twist lock opening state sensor 19 has no signal, the hydraulic hoist is locked, and the locking is released during the rest time, thereby preventing the hoist from misoperation when the twist locks 5 are not rotated in place.

Further, the four twist locks are driven by a hydraulic cylinder, which enables the four twist locks to operate at the same time, and the four twist locks on the frame are interlocked with the four corner-fitting holes at one time, which can reduce the errors of one or a plurality of locking heads being not rotating and being not rotating synchronously to a certain extent. The anti-detaching mechanisms do not require an additional driving mechanism, and are capable of operating with the twist locks, which ensures the safety of underground operation. When the twist locks fail to act or break, the pressure sensor is capable of detecting the abnormal states of the twist locks in time.

When the hoist does not lift heavy weights, the size of the hoist is reduced through a cooperation between the folding mechanism and the rope-pulling mechanism to adapt to the narrow and complex terrain of the roadway, and when the hoist lifts the heavy weights, it is capable of ensuring the rigidity of the entire structure.

The above descriptions are only preferred specific implementations of the present disclosure, but the protection scope of the present disclosure is not limited thereto. Any equivalent replacements or changes made by a skilled person familiar with the art within the technical scope disclosed by the present disclosure according to the technical solutions of the present disclosure and its inventive concept, shall be covered within the protection scope of the present disclosure.

What is claimed is:

1. A hoist for transferred materials in an underground auxiliary transportation system, comprising:

a hoist body, wherein four corners at two ends of the hoist body are respectively provided with twist locks inserted into lock holes at four top corners of a transferring trolley; and a driving unit, arranged inside the hoist body, and drivingly connected with the four twist locks through a linkage mechanism, wherein the hoist further includes:

a twist lock closing sensor, configured to send a twist lock closing signal when the twist locks are closed;

a twist lock opening sensor, configured to send a twist lock opening signal when the twist locks are opened;

a pressure sensor, configured to detect an axial pressure received by each of the twist locks in real time and send a pressure signal;

ejector pins, arranged at end portions of the hoist body and located on one sides of the twist locks, wherein after the four twist locks on the hoist and the lock holes at the four top corners of the transferring trolley are in position with each other, the ejector pins are movable;

ejector pin position-limitation sensors, configured to detect movements of the ejector pins and send displacement signals;

a laser ranging sensor, arranged on the hoist body and configured to measure a distance between the hoist body and the transferring trolley; and a photosensitive sensor, arranged on the transferring trolley and configured to receive a laser signal from the laser ranging sensor, wherein the hoist body includes:

a cross beam; and two end beams, symmetrically arranged at both ends of the cross beam along a longitudinal direction, wherein both ends of each of the end beams are provided with shaft holes, respectively, and one of the twist locks is mounted inside each of the shaft holes; wherein the driving unit is assembled on a beam wall at a middle position inside the cross beam, and two telescopic driving shafts are symmetrically arranged on the driving unit with the driving unit as a center;

the linkage mechanism includes two groups respectively connected with the two telescopic driving shafts of the driving unit, and each group of the linkage mechanisms includes a pushing rod, a connecting rod, first sliding blocks and rotating levers, wherein one end of the pushing rod is connected with a respective one of the telescopic driving shafts through a coupling, and another end of the pushing rod is connected with the connecting rod arranged inside the end beam, sliding channels arranged along an axial direction of the connecting rod are respectively arranged at both ends of the connecting rod, the first sliding blocks are mounted inside the sliding channels, and the rotating levers are key connected with the first sliding blocks; and an upper portion of each of the twist locks is connected with a twist lock shaft, and an upper end of the twist lock shaft is sequentially connected with shaft holes of the pressure sensor, a positioning sleeve and a respective one of the rotating levers to connect with a locking nut after the upper end of the twist lock shaft passes through a respective one of the shaft holes on the end beam and enters an interior of the end beam.

2. The hoist for the transferred materials in the underground auxiliary transportation system according to claim 1, wherein each of the end beams is a foldable structure, including:

one fixed end beam unit, and two foldable end beam units connected at both ends of the fixed end beam unit, wherein the two foldable end beam units are respectively a first foldable end beam unit and a second foldable end beam unit, the two foldable end beam units are rotatable relative to the fixed end beam unit, and the end beam further includes:

a first folding arm, a second folding arm, connecting seats, hinging seats and a first hydraulic cylinder, wherein, the first folding arm and the second folding arm are hinged with each other at adjacent ends, and another end of the first folding arm is fixedly connected to a respective one of the connecting seats, the respective one of the connecting seats is mounted on the first foldable end beam unit, and is slidable on the first foldable end beam unit;

another end of the second folding arm is fixedly connected to a respective one of hinging seats, and the respective one of the hinging seats is mounted on the second foldable end beam unit and is slidable on the second foldable end beam unit; and the first hydraulic cylinder is connected between the first folding arm and the second folding arm, a cylinder barrel of the first hydraulic cylinder is hinged with the first folding arm through a hinged joint, and an outer end of a piston rod of the first hydraulic cylinder is hinged with the second folding arm.

3. The hoist for the transferred materials in the underground auxiliary transportation system according to claim 2, wherein the cross beam is a retractable structure, including:

one fixed cross beam unit and two movable cross beam units connected at both ends of the fixed cross beam unit, wherein the two movable cross beam units are respectively a first movable cross beam unit and a second movable cross beam unit, and the two movable cross beam units are slidable relative to the fixed cross beam unit, the pushing rod includes a plurality of pushing rod units, each two adjacent pushing rod units are hinged with each other, wherein one of the pushing rod units is connected with a driving shaft of a hydraulic motor, and a sliding track is arranged on a beam wall of each of the movable cross beam units, and the hydraulic motor is slidably connected with the sliding track.

4. The hoist for the transferred materials in the underground auxiliary transportation system according to claim 3, further including a rope-pulling mechanism, wherein the rope-pulling mechanism includes:

a first fixed pulley, a second fixed pulley, a movable pulley, a wire rope and a second hydraulic cylinder, wherein one end of the wire rope is fixed on the first movable cross beam unit, and another end of the wire rope is fixedly connected with the second movable cross beam unit after passing by an upper end of the first fixed pulley, a lower end of the movable pulley and an upper end of the second fixed pulley sequentially, and one end of the second hydraulic cylinder is fixed on an inner wall of the fixed cross beam unit, and an end of a piston rod of the second hydraulic cylinder is connected with the movable pulley.

5. A method for hoisting transferred materials in an underground auxiliary transportation system, which uses the hoist for the transferred materials in the underground auxiliary transportation system according to claim 4, wherein the method includes following steps:

a method for positioning the hoist: moving, by an operator, a hoist body above a transferring trolley 9, and sending, when a signal from a laser ranging sensor 7 is detected by a photosensitive sensor 8, a prompt signal, where the hoist body is located directly above a standard container and the operator enables the hoist to start for operation; and reducing, when a roadway is narrow, a size of the hoist to adapt to a narrow and complex terrain of the roadway through contracting a width of a cross beam and folding end beams, and unfolding, when the hoist reaches the underground, the hoist;

a process of lifting heavy weights by the hoist: determining, before the hoist is descended, an operating state of the hoist by a pressure sensor 36, recording the operating state as operating state A, detecting, by a hydraulic lifting system, signals from ejector pin position-limitation sensors 21 and a twist lock closing sensor 18; locking, only when the ejector pin position-limitation sensors 21 have signals and the twist lock closing sensor 18 has no signal, the hydraulic lifting system, and releasing the locking of the hydraulic lifting system during the rest time;

adjusting, according to a signal fed back by the laser ranging sensor 7, a descending speed of the hoist body by the hoist body during the descending process;

ejecting, when the hoist is in contact with the standard container 2, the ejector pins 4, sending, by the ejector pin position-limitation sensors 21, signals to stop the hydraulic lifting system from descending and lock an elevation, meanwhile, driving, by a driving unit, four twist locks at end portions of the hoist body to rotate 90 degrees at the same time, and enabling connecting rods 11 to be in contact with the twist lock closing state sensor 18;

at this time, performing, when a contact signal is not sent by the twist lock closing state sensor 18 beyond a time limit, no actions and sending an alarm by the hydraulic lifting system; and starting lifting, when the contact signal is sent by the twist lock closing state sensor 18, the hoist body by the hydraulic lifting system, wherein the hydraulic lifting system is in a loading state, monitoring, by the pressure sensor 36, forces received by four twist locks when the standard container 2 is hoisted in real time, and sending, when data for one or more pressure sensors are abnormal and the displayed pressure is 0 or exceeds an upper limit, an alarm by the hoist; and a process of releasing heavy weights by the hoist: determining, before the hoist body is descended, an operating state of the hoist body by the pressure sensor 36, recording the operating state as an operating state B, changing, according the signals fed back by the laser ranging sensor 7 and a change of a distance, a speed of the hydraulic lifting system by the hoist during the descending process, ejecting, when the hoist body is in contact with the standard container 2, the ejector pins 4, sending signals by the ejector pin position-limitation sensors 21, driving, by the hydraulic lifting system, the hoist to stop from descending and lock an elevation, meanwhile, driving, by the driving unit, the twist locks to rotate 90 degrees in opposite directions, enabling the connecting rods 11 to be in contact with the twist lock opening state sensor 19, at this time, performing, when the contact signal is not sent by the twist lock opening state sensor 19 beyond the time limit, no actions and sending the alarm by the hydraulic lifting system; and indicating, when the contact signal is sent by the twist lock opening state sensor 19, that the releasing is successful.

6. The method for hoisting the transferred materials in the underground auxiliary transportation system according to claim 5, wherein the hydraulic lifting system is a hydraulic hoist.

7. The hoist for the transferred materials in the underground auxiliary transportation system according to claim 1, further including anti-detaching mechanisms arranged on the end beams proximate to the twist locks, wherein each of the anti-detaching mechanisms includes:

a cam, mounted on the connecting rod;

a baffle, fixed inside the end beam, wherein the baffle is provided with a vertical sliding channel slidably connected with a transmission component through a second sliding block, an upper end of the transmission component is in contact with the cam through a first roller, two bifurcation portions are formed by a lower end of the transmission component, and an end portion of each of the two bifurcation portions is connected with one second roller; and two claws, wherein one end of each of the two claws is rotatably connected with the baffle, and a spring is connected between the two claws.

8. The hoist for the transferred materials in the underground auxiliary transportation system according to claim 1, wherein the driving unit is a double-rod hydraulic cylinder.

* * * * *